May 21, 1940.  E. M. KEEN  2,201,901
HEATING DEVICE FOR WATER FOUNTAINS
Filed Dec. 29, 1938
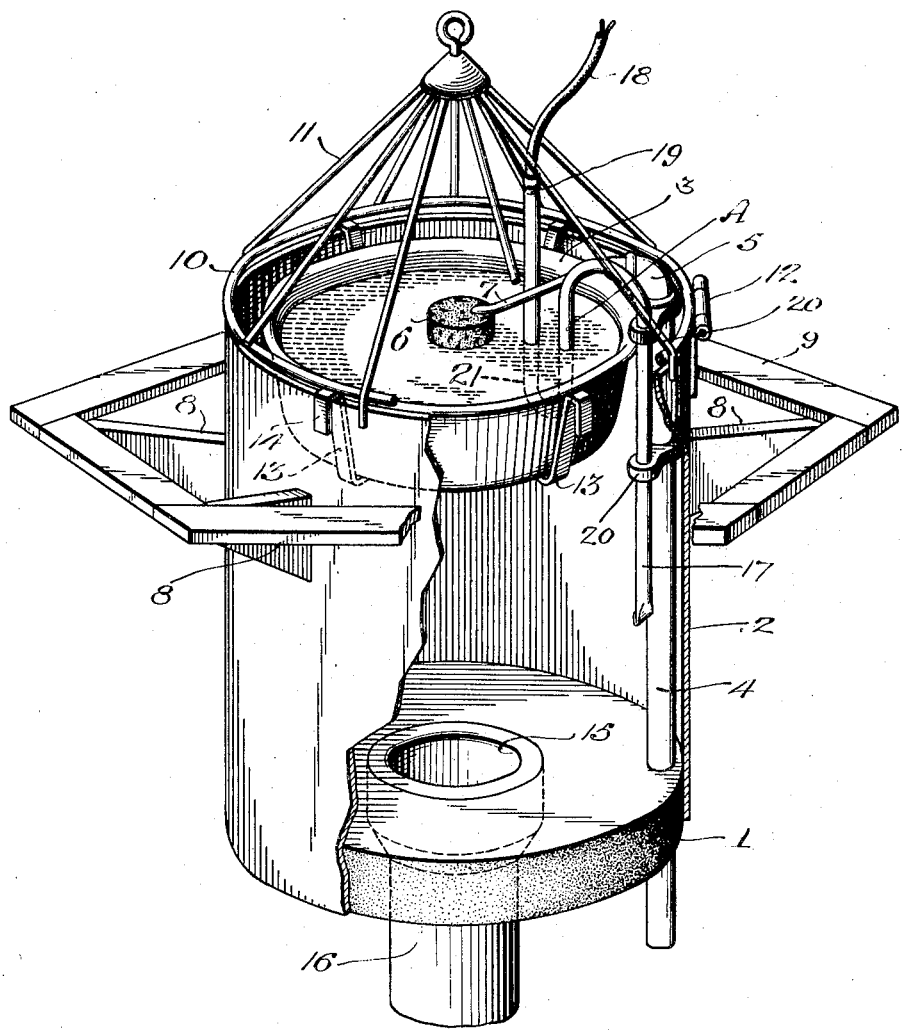
Inventor:
Everett M. Keen
by his Attorneys
Howson & Howson Patented May 21, 1940

2,201,901

UNITED STATES PATENT OFFICE 2,201,901

HEATING DEVICE FOR WATER FOUNTAINS

Everett M. Keen, Vineland, N. J.

Application December 29, 1938, Serial No. 248,325

4 Claims. (Cl. 219—38)

This invention relates to improvements in heating devices for drinking fountains for poultry and live stock, and more particularly to fountains equipped with means for automatic water supply.

A principal object of the invention is to provide a simple, efficient and inexpensive heater for fountains of the stated type.

Another object of the invention is to provide an electric heater which may be manufactured at small expense, will be entirely waterproof, durable and trouble-free, and which will be highly adaptable not only to the various commercial types of fountain, but also to others of less conventional design.

The invention further resides in certain novel structural details hereinafter described and illustrated in the attached drawing, wherein I have shown in perspective a conventional form of poultry drinking fountain equipped with a heater made in accordance with my invention.

With reference to the drawing, the fountain therein illustrated consists of a base member 1 conventionally of concrete, a cylindrical casing 2 which may be made of sheet metal and which embraces the base as shown, a pan or tray 3 for water which is supported by suitable means at the top of the cylindrical casing 2, and a water supply pipe 4 which extends upwardly through the base 1 and through the casing 2 to a position above the pan 3. The pipe 4 includes a valve 5 which is operated automatically through the medium of a float 6 in the pan 3, said float being connected to the valve mechanism by means of a rod 7. The float-controlled valve 5 maintains the water in the pan 3 automatically at or near a predetermined level. At the outside and surrounding the casing 2, and in the present instance supported on the casing through the medium of brackets 8, is a perch 9 upon which the fowl may stand when drinking from the pan 3. Conventionally a wire guard is supported at the top of the casing 2 to prevent the fowl from entering the pan 3, said guard nevertheless permitting access to the pan for drinking purposes. In the present instance, the guard, which consists of a base ring 10 of wire and a series of rods 11 which converge to a point above the ring, is hinged at 12 to the top of the casing 2 which permits displacement of the guard from its normal position above the pan. The pan 3 is supported by a rack consisting in the present instance of a pair of cross wires 13, 13, the ends 14 of which are turned outwardly over the upper edge of the casing 2 as shown. In the conventional installation, the base 1 is set in the ground, and it will be noted that the base has an opening 15 which communicates with a drain pipe 16, said pipe extending to a suitable sewer or drain.

Insofar as described the fountain in its construction and mode of operation is well understood in the industry. It will be noted that the arrangement is such that water dislodged from the pan 3 by the fowl or dripping from the pan passes into the bottom of the casing 2 and is discharged through the drain pipe 16. Similarly in cleaning the pan, it is only necessary to lift one side thereof from its bracket support to permit the water to discharge into and from the casing 2, as previously described.

In cold weather, it is necessary in fountains of this type to provide means for preventing freezing of the supply pipe 2, particularly in the exposed portion thereof including the valve 5. It is necessary also to maintain the water in the tray at a temperature above the freezing point and suitable for consumption by the fowl. Various devices are used for this purpose, such for example as oil burners or lamps, but these are generally unsatisfactory by reason of the odor and dirt which they generate, and also by reason of the necessity for required periodic servicing and refueling. It has been proposed also to heat fountains of this type electrically, but the prior electrical devices have been inadequate largely by reason of their failure to adequately heat the supply pipe in the relatively exposed valve area and also to maintain the water in the pan at a desirably warm temperature.

One of the factors heretofore precluding the use of electricity as a heating medium has been the requirement under the conditions in which these fountains operate for electrical equipment which is entirely waterproof and immune to deterioration or damage by contact with water. So far as I am aware, no electrical heating means had been devised prior to my invention which was both immune to water damage and sufficiently inexpensive and economical to justify its use in this class of equipment. By the present invention, I provide an electric heater which not only is entirely immune to damage by water but which is extremely simple in form and inexpensive to manufacture, which further is highly efficient in preventing freezing of the supply pipe and of the automatic valve means, and which also may be depended upon to maintain the water in the tray at a temperature above freezing and suitable for consumption by the fowl.

A heater made in accordance with my invention comprises a tube or sheath 17 preferably of a non-corrodible ductile metal, such as copper, in which is inserted an asbestos-covered electrical heating element. Heating elements of this character are well known and available in the trade. This heating element is of lesser length than the tube and extends from one end of the latter to an intermediate point where it joins an asbestos-covered conductor extending from the other end of the tube. The conductor in turn is connected to a rubber-covered lead wire 18. This end of the tube 17 is sealed around the rubber insulation of the wire 18 by suitable means, and I have found it practical to form this seal by rolling or otherwise pressing the metal of the sheath inwardly so that it clamps solidly against the rubber insulation around the complete circumference. This pressed-in section of the tube 17 is indicate at 19. The opposite end of the tube 17 is also sealed, as for example by crimping and soldering. That portion of the tube 17 containing the heating element is then secured by suitable means in proximity to or against the supply pipe 4 in the interior of the casing 2 and to the valve 5. In the present instance, the tube is clamped to but is not in direct contact with the pipe 4, the clamps being indicated by the reference numeral 20. From the valve, the tube 17 turns downwardly and again upwardly to form a depending loop 21 which enters and is partially immersed in the water in the pan 3, and the upper terminal end of the tube is elevated as shown well above the level of the water. The heating element preferably extends continuously from the lower end of the tube to a point indicated at A which is slightly above the level of the water in the pan, so that the directly heated portion of the tube embraces the supply pipe 4 and the valve 5, but does not extend to water in the pan 3. As a result of this arrangement, the heat generated by the heating coil is carried by conduction through the copper tube downwardly into the immersed portion of the loop 21, thereby supplying heat to the water in the pan, and at the same time the immersed portion of the tube precludes the passage by conduction of any substantial portion of the generated heat to the upper terminal end of the tube and to the rubber-insulated lead wire 18. The immersed portion of the tube 17, therefore, performs a double function, in that it supplies heat to the water in the pan, and prevents damaging heat from reaching the rubber insulation of the lead wire 18, thereby insuring that the waterproof joint at the upper terminal end of the tube shall be maintained under conditions of use. In the absence of the immersed portion of the tube 17, sufficient heat would be carried by conduction through the tube to the upper terminal end of the latter to destroy the rubber insulation of the lead wire and with it the essential waterproof joint between the tube and the lead wire.

When the lower actively heated end of the tube 17 is held away from direct contact with the pipe 4 and the valve 5, it will be apparent that the heat supplied to the pipe and to the valve from the heating element will be by radiation from the metal sheath 17, except for that part of the heat which is conducted from the tube to the pipe through the clamps 20, 20. By insulating the tube 17 from the clamps 20, or by utilizing for the clamps materials of a non-conducting character, the heat passing to the pipe and the valve by conduction may be eliminated or reduced to a negligible amount. On the other hand, the heat is carried to the water in the pan 3 by conduction through the copper tube 17 by reason of the immersion of the loop 21. It is apparent that under some circumstances a more intimate relation between the tube 17 and the pipe 4 and the valve 5 may be necessary or desirable, in which case the actively heated portion of the tube 17 may be secured in direct contact with the pipe and the valve. Similarly, if more heat is required in the water, the electric heating element within the tube may be extended into the immersed portion of the tube, but should not be extended beyond the immersed portion of the tube. It is to be noted further that the lower actively heated portion of the tube 17 which occupies a position in the interior of the casing 2 will supply heat by radiation to the air in the interior of the casing, and through the air by convection to the bottom walls of the pan 3. It has been found unnecessary to extend the heating element below the point in the interior of the casing 2 in which it is shown in the drawin, but if under severe conditions a larger portion of the pipe 4 requires heating the tube 17 may be extended accordingly.

The extreme simplicity and economical construction of the heater is to be particularly noted. The heater comprises merely a length of copper or other suitable tubing, a commercial form of asbestos-covered heating element, and an asbestos-covered conductor and rubber-insulated lead-in wire. The production of the heater involves no manufacturing complication, so that the heater may be produced at extremely low cost. The heater is thoroughly waterproof and free from damage by contact with water, and is sufficiently flexible to permit its being applied to practically any form of drinking fountain.

I claim:

1. The combination with a receptacle and a water supply pipe extending to the receptacle, of a tubular member having a portion thereof extending in heat exchange relation to said pipe and containing an electric heating element, an insulated conductor entering one end of said tube and connected to said heating element, a portion of the tube adjoining said end being immersed in the water in said receptacle and thereby insulating said end against passage of heat by conduction from the actively heated portion of the tube, and sealing means for the ends of said tube.

2. The combination with a receptacle, a water supply pipe extending to the receptacle, a valve in said pipe, and means for automatically operating said valve to replenish water withdrawn from the receptacle, of a tubular member having a portion thereof extending in heat exchange relation to said pipe and valve and containing an electric heating element, and an insulated conductor entering one end of said tube and connected to said heating element, a portion of the tube adjoining said end being immersed in the water in said receptacle and thereby insulating said end against the passage of heat by conduction from the actively heated portion of the tube.

3. The combination with a casing, of a receptacle mounted in the top of said casing, and a water supply pipe extending through said casing to the receptacle, of a tubular member having a portion thereof extending in the interior of said casing in heat exchange relation to said pipe and containing an electric heating element, and an insulated conductor entering an end of said tube and connected to said heating element, a portion of the tube adjoining said end being immersed in the water in said receptacle and thereby insulating said end against passage of heat by conduction from the actively heated portion of the tube.

4. For use with apparatus of the character described comprising a receptacle and a water supply pipe extending to said receptacle, an electric heater comprising a metallic tubular member having one end thereof shaped to extend in substantially parallel heat exchange relation to said pipe and containing at that end an electric heating element, an insulated conductor extending into the opposite end of said tube and connected to said heating element, the said end of the tube being formed to tightly embrace the insulating cover of said conductor to thereby seal the tube, an intermediate portion of the tube being shaped to enter the receptacle for immersion in the contained water to thereby insulate the conductor-receiving end against excessive heating by conduction from the actively heated portion of the tube, and means for sealing the end of said tube.

EVERETT M. KEEN.